US005566452A

United States Patent [19]
Sample

[11] Patent Number: 5,566,452
[45] Date of Patent: Oct. 22, 1996

[54] DUAL NUTCRACKER

[76] Inventor: Severn Sample, 1829 Hervey Ave., North Chicago, Ill. 60064

[21] Appl. No.: 396,764

[22] Filed: Mar. 1, 1995

[51] Int. Cl.$^6$ ................................................ B26B 17/00
[52] U.S. Cl. .......................................... 30/120.3; 30/120.2
[58] Field of Search ............................... 30/120.1, 120.2, 30/120.3, 120.4, 120.5; 99/568; D7/680

[56] References Cited

U.S. PATENT DOCUMENTS 1,282,278  10/1918  Neumann ................................ 30/120.4
4,171,567  10/1979  Papalardo ............................... 30/120.4

FOREIGN PATENT DOCUMENTS 508339  10/1920  France ..................................... 30/102.4
735108   8/1955  United Kingdom ..................... 30/102.3

*Primary Examiner*—Hwei-Siu Payer
*Attorney, Agent, or Firm*—Michael I. Kroll

[57] ABSTRACT

A dual nutcracker comprising a first undulating lever and a second straight lever. A structure is for pivoting the first undulating lever to the second straight lever. The shells of different sized nuts can be cracked with a scissor-like action, when the first undulating lever and the second straight lever are gripped by a hand of a person and squeezed together.

1 Claim, 2 Drawing Sheets

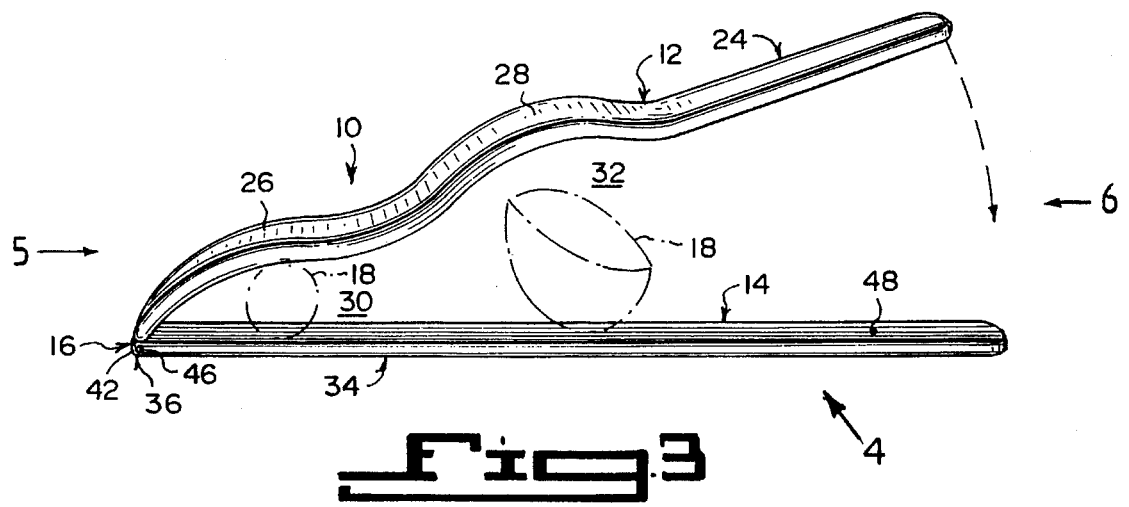
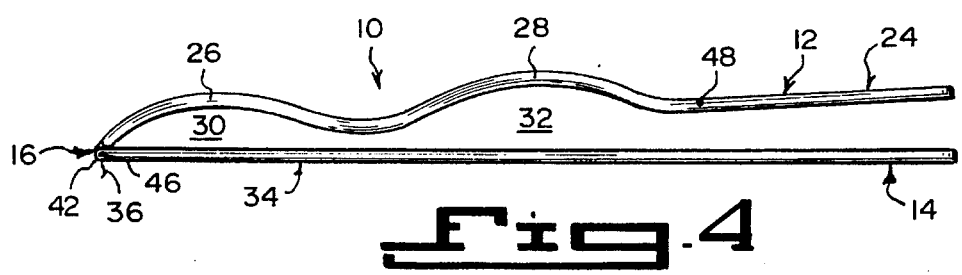
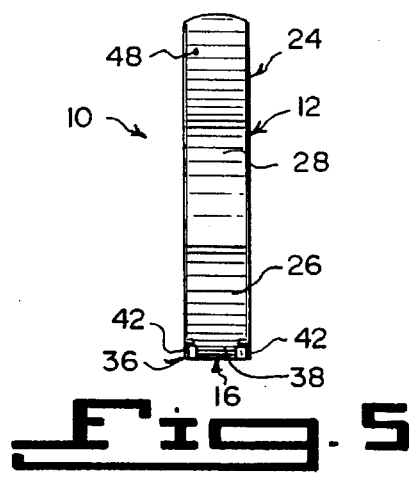
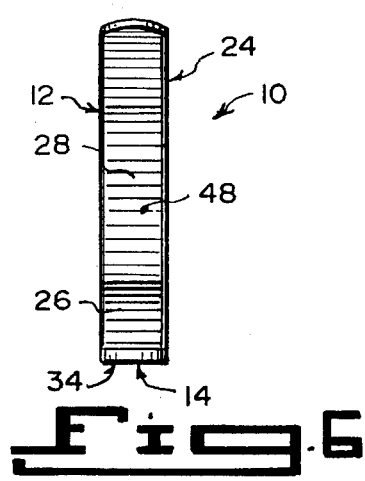

DUAL NUTCRACKER

BACKGROUND OF THE INVENTION

1. Field of the Invention

The instant invention relates generally to nutcrackers and more specifically it relates to a dual nutcracker.

2. Description of the Prior Art

Numerous nutcrackers have been provided in prior art that are adapted to crack the shells of nuts, so that the nuts can be used for eating. While these units may be suitable for the particular purpose to which they address, they would not be as suitable for the purposes of the present invention as heretofore described.

SUMMARY OF THE INVENTION

A primary object of the present invention is to provide a dual nutcracker that will overcome the shortcomings of the prior art devices.

Another object is to provide a dual nutcracker, in which one of the two levers has two arched portions, to accommodate different sized nuts with a scissor-like action.

An additional object is to provide a dual nutcracker, in which the arched portions will permit the cracking of the shells of the nuts without crushing the nuts.

A further object is to provide a dual nutcracker that is simple and easy to use.

A still further object is to provide a dual nutcracker that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

Various other objects, features and attendant advantages of the present invention will become more fully appreciated as the same becomes better understood when considered in conjunction with the accompanying drawings, in which like reference characters designate the same or similar parts throughout the several views, and wherein:

FIG. 3 is a perspective view of the instant invention per se, taken in the direction of arrow 3 in FIG. 1, in a raised opened position.

FIG. 4 is a side view taken in the direction of arrow 4 in FIG. 3, in a lowered closed position.

FIG. 5 is a left end view taken in the direction of arrow 5 in FIG. 3.

FIG. 6 is a right end view taken in the direction of arrow 6 in FIG. 3.

Similar reference characters denote corresponding features consistently throughout the attached drawings.

DETAILED DESCRIPTION OF THE PREFERRED EMBODIMENTS

Figure 1:
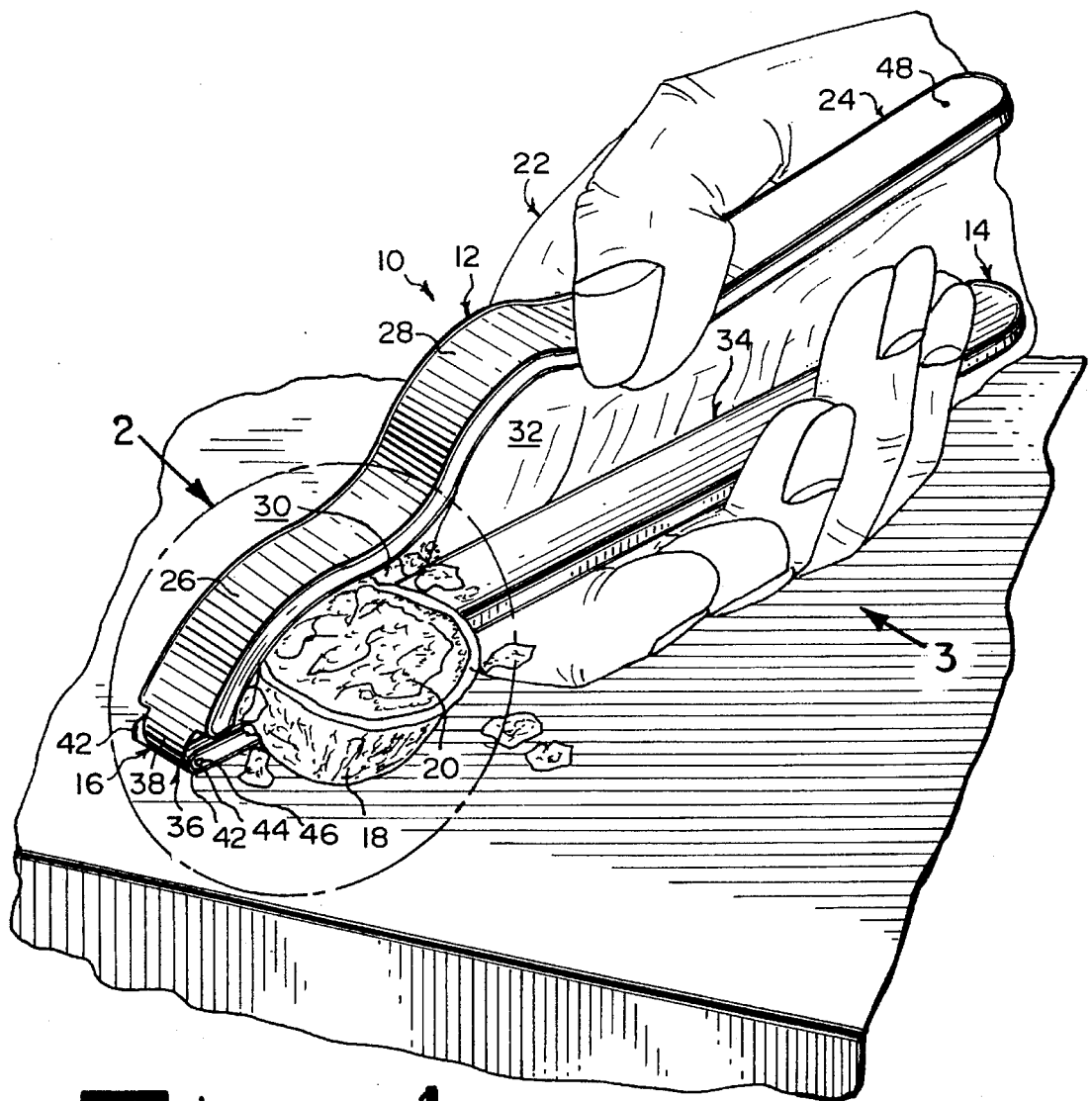
FIG. 1 is a perspective view of the instant invention gripped by a hand and in use cracking a shell of a nut.
Figure 2:
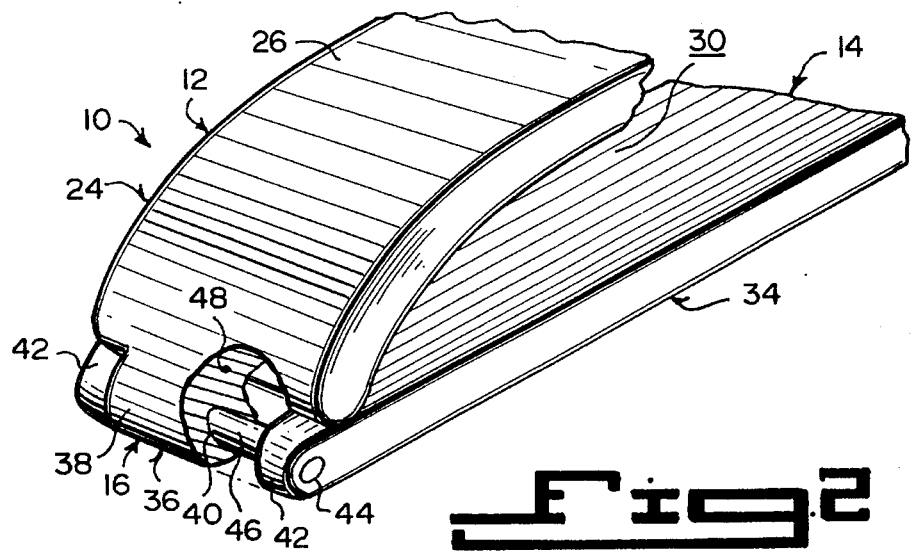
FIG. 2 is an enlarged perspective view of an area as indicated by arrow 2 in FIG. 1, with parts broken away and in section.

Turning now descriptively to the drawings, in which similar reference characters denote similar elements throughout the several views, FIGS. 1 through 6 illustrate a dual nutcracker 10, comprising a first undulating lever 12 and a second straight lever 14. A structure 16 is for pivoting the first undulating lever 12 to the second straight lever 14. The shells 18 of different sized nuts 20 can be cracked with a scissor-like action, when the first undulating lever 12 and the second straight lever 14 are gripped by a hand 22 of a person and squeezed together.

The first undulating lever 12 is a first flat bar 24, having a first arched portion 26 adjacent the pivoting structure 16 and a second arched portion 28 adjacent the first arched portion 26 and being straight except for the arched portions 26,28. A first cracking area 30 is provided between the first arched portion 26 and the second straight lever 14. A second cracking area 32 is provided between the second arched portion 28 and the second straight lever 14. The second straight lever 14 is a second flat bar 34.

The pivoting structure 16 is a hinge 36 located between forward ends of the first flat bar 24 and the second flat bar 34. The rearward ends of the first flat bar 24 and the second flat bar 34 are gripped by the hand 22 of the person.

The hinge 36 includes a central barrel 38 formed on the forward end of the first flat bar 24. The central barrel 38 has a longitudinal aperture 40 therethrough. A pair of side knuckles 42 are formed on the forward end of the second flat bar 34. Each side knuckle 42 has a hole 44 therethrough. The central barrel 38 can fit between the side knuckles 42 with the longitudinal aperture 40 in alignment with the holes 44 in the side knuckles 42. A pin 46 extends through the holes 44 in the side knuckles 42 and the longitudinal aperture 40 in the central barrel 38, to allow the first flat bar 24 to pivot with respect to the second flat bar 34. The first flat bar 24 can go from a raised open position in FIG. 3, to a lowered closed position in FIG. 4, to crack the shells 18 of the nuts 20.

The first flat bar 24, the second flat bar 34 and the hinge 36 are of the same width. The width of the first flat bar 24, the second flat bar 34 and the hinge 36 is one half an inch. The first flat bar 24, the second flat bar 34 and the hinge 36 are fabricated out of a durable material. The durable material is a sturdy lightweight aluminum 48. The length of the first flat bar 24 and the second flat bar 34 to the hinge 36 is approximately nine inches.

OPERATION OF THE INVENTION

To use the dual nutcracker 10, the following steps should be taken:

1. Place a shell 18 of a small nut 20 in the first cracking area 30 between the first arched area 26 of the first flat bar 24 of the first undulating lever 12 and the second flat bar 34 of the second straight lever 14.

2. Grip the first undulating lever 12 and the second straight lever 14 by the hand 22 and squeeze them together, thereby cracking the shell 18 of the small nut 20.

3. Place a shell 18 of a larger nut 20 in the second cracking are 32 between the second arched area 28 of the first flat bar 24 of the first undulating lever 12 and the second flat bar 34 of the second straight lever 14.

4. Grip the first undulating lever 12 and the second straight lever 14 by the hand 22 and squeeze them together, thereby cracking the shell 18 of the large nut 20.

LIST OF REFERENCE NUMBERS 10 dual nutcracker
12 first undulating lever
14 second straight lever
16 pivoting structure
18 shell
20 nut
22 hand
24 first flat bar for 12
26 first arched area of 24
28 second arched area of 24
30 first cracking area between 26 and 14
32 second cracking area between 28 and 14
34 second flat bar for 14
36 hinge for 16
38 central barrel on 24
40 longitudinal aperture in 38
42 side knuckle on 34
44 hole in 42
46 pin
48 sturdy lightweight aluminum It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A dual nutcracker comprising:
   a) a first undulating lever;
   b) a second straight lever comprising a flat bar of solid uniform cross section along the whole length thereof;
   c) means for pivoting said first undulating lever to said second straight lever, said pivoting means consisting of a hinge located between the forward ends of said first lever and said second lever, said hinge including a central barrel with a longitudinal aperture therethrough formed on the forward end of said first lever, a pair of side knuckles formed on the forward end of said second lever, each said side knuckle having a hole therethrough permitting said central barrel to fit between said side knuckles with said longitudinal aperture in alignment with said holes in said side knuckles, and a pin extending through said holes in said side knuckles and said aperture in said central barrel to allow said first lever to pivot with respect to said second lever; and
   d) said first undulating lever having means for cracking different sized nuts with a scissor-like action when said first lever and said second lever are gripped by a hand of a person and squeezed together, said cracking means comprising a flat bar member with a first arched portion adjacent said pivoting means and a second arched portion adjacent said first arched portion, a first cracking area formed between said first arched portion and said second straight lever and a second cracking area formed between said second arched portion and said second straight lever, said first undulating lever being straight except for said first and second arched portions, and said first lever, second lever, and said hinge being all of the same width and fabricated out of sturdy, lightweight aluminum.

* * * * *